United States Patent
Yi et al.

(10) Patent No.: US 9,543,621 B2
(45) Date of Patent: Jan. 10, 2017

(54) ELECTRODE ASSEMBLY AND BATTERY PACK INCLUDING THE SAME

(71) Applicant: SAMSUNG SDI CO., LTD., Yongin-si, Gyeonggi-do (KR)

(72) Inventors: Jeong-Doo Yi, Yongin-si (KR);
Bong-Kyoung Park, Yongin-si (KR);
Hye-Jung Lee, Yongin-si (KR);
Feygenson Naum, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 263 days.

(21) Appl. No.: 14/468,981

(22) Filed: Aug. 26, 2014

(65) Prior Publication Data

US 2015/0072203 A1    Mar. 12, 2015

(30) Foreign Application Priority Data

Sep. 9, 2013  (KR) .......................... 10-2013-0108065

(51) Int. Cl.
| | |
|---|---|
| *H01M 10/0587* | (2010.01) |
| *H01M 10/04* | (2006.01) |
| *H01M 2/26* | (2006.01) |
| *H01M 10/052* | (2010.01) |

(52) U.S. Cl.
CPC ......... *H01M 10/0587* (2013.01); *H01M 2/263* (2013.01); *H01M 10/0431* (2013.01); *H01M 10/052* (2013.01); *H01M 2220/30* (2013.01)

(58) Field of Classification Search
CPC ....................... H01M 10/0587; H01M 10/0431
See application file for complete search history.

(56) References Cited

U.S. PATENT DOCUMENTS

| | | |
|---|---|---|
| 2003/0215702 A1 | 11/2003 | Tanjou et al. |
| 2010/0099020 A1 | 4/2010 | Ouwerkerk et al. |
| 2011/0016706 A1* | 1/2011 | Jan .......................... H01M 2/18 29/623.1 |
| 2011/0117420 A1 | 5/2011 | Kim et al. |
| 2012/0034504 A1* | 2/2012 | Kaneda ................... H01M 4/13 429/94 |
| 2015/0072218 A1* | 3/2015 | Yi ....................... H01M 2/0275 429/158 |

FOREIGN PATENT DOCUMENTS

| | | |
|---|---|---|
| JP | 11-067184 | 3/1999 |
| JP | 2004-111098 | 4/2004 |
| KR | 10-0614375 B1 | 8/2006 |

* cited by examiner

*Primary Examiner* — Nicholas A Smith
(74) *Attorney, Agent, or Firm* — Lee & Morse, P.C.

(57) ABSTRACT

An electrode assembly includes a structure including a first electrode plate and a second electrode plate that are wound together, and a separator between the first electrode plate and the second electrode plate, a first electrode tab that is electrically connected to the first electrode plate, and a second electrode tab that is electrically connected to the second electrode plate. The structure includes a pair of grooves at opposite sides of the structure, the grooves being formed by compression of the structure at the opposite sides in a direction perpendicular to a winding surface. The structure including a first part and a second part that are oppositely located with respect to a reference line connecting the pair of grooves, and the second part is shifted in a first direction such that the second part is partially misaligned with the first part.

20 Claims, 5 Drawing Sheets

ELECTRODE ASSEMBLY AND BATTERY PACK INCLUDING THE SAME

CROSS-REFERENCE TO RELATED APPLICATION

Korean Patent Application No. 10-2013-0108065, filed on Sep. 9, 2013, in the Korean Intellectual Property Office, and entitled: "Electrode Assembly and Battery Pack Including The Same," is incorporated by reference herein in its entirety.

BACKGROUND

1. Field

One or more embodiments relate to an electrode assembly and a battery pack including the same.

2. Description of the Related Art

Secondary batteries are rechargeable, unlike primary batteries which are not rechargeable. Secondary batteries may be economical and environmentally friendly. Recently, types of electronic devices using secondary batteries have been diversified, and designs of electronic devices have become an important factor in determining the purchase of electronic devices.

For example, various wearable computers using secondary batteries as a power supply source, and applications thereof have been developed. Also, electronic devices, such as mobile phones and laptop computers, have been designed to have curved surfaces for ergonomic purposes.

SUMMARY

Embodiments are directed to an electrode assembly including a structure including a first electrode plate and a second electrode plate that are wound together, and a separator between the first electrode plate and the second electrode plate, a first electrode tab that is electrically connected to the first electrode plate, and a second electrode tab that is electrically connected to the second electrode plate. The structure includes a pair of grooves at opposite sides of the structure, the grooves being formed by compression of the structure at the opposite sides in a direction perpendicular to a winding surface, the structure including a first part and a second part that are oppositely located with respect to a reference line connecting the pair of grooves. The second part is shifted in a first direction such that the second part is partially misaligned with the first part.

The first part may be under the second part. An upper surface of the first part and a lower surface of the second part may be on a same line.

The first direction may be parallel to a ground surface.

A cross-sectional area of the first part and a cross-sectional area of the second part perpendicular to the winding surface may be equal to each other.

The first part and the second part may be inversely symmetrical to each other.

The first electrode tab and the second electrode tab may be parallel to the winding surface. The first electrode tab and the second electrode tab may protrude in opposite directions from the structure.

The first electrode plate may include a first active material portion that is coated with a first active material and a first uncoated portion that is not coated with the first active material. The first electrode tab may be electrically connected to the first uncoated portion.

The second electrode plate may include a second active material portion that is coated with a second active material and a second uncoated portion that is not coated with the second active material. The second electrode tab may be electrically connected to the second uncoated portion.

Embodiments are also directed to a battery pack including a first sealing film and a second sealing film joined to each other to provide a sealing space, and electrode assemblies in the sealing space. Each of the electrode assemblies may include a structure including a first electrode plate and a second electrode plate that are wound together, and a separator that is interposed between the first electrode plate and the second electrode plate. The structure may include a pair of grooves at opposite sides of the structure, the grooves being formed by compression of the structure at the opposite sides in a direction perpendicular to a winding surface, the structure including a first part and a second part oppositely located with respect to a reference line connecting the pair of grooves. The second part may be shifted in a first direction such that the second part is partially misaligned with the first part.

The first part may be under the second part. An upper surface of the first part and a lower surface of the second part may be on a same line.

The electrode assemblies may be aligned to form an electrode assembly array in which the first part of one of the electrode assemblies is on the second part of an adjacent electrode assembly.

The electrode assembly array may be bent in a second direction that is perpendicular to the first direction.

The first direction may be parallel to a ground surface.

A cross-sectional area of the first part and a cross-sectional area of the second part perpendicular to the winding surface may be equal to each other.

The first part and the second part may be inversely symmetrical to each other.

Each of the electrode assemblies may further include a first electrode tab that is electrically connected to the first electrode plate and a second electrode tab that is electrically connected to the second electrode plate. The first electrode tab and the second electrode tab may protrude in opposite directions from the structure.

The first electrode plate may include a first active material portion that is coated with a first active material and a first uncoated portion that is not coated with the first active material. The first electrode tab may be electrically connected to the first uncoated portion. The second electrode plate may include a second active material portion that is coated with a second active material and a second uncoated portion that is not coated with the second active material. The second electrode tab may be electrically connected to the second uncoated portion.

The battery pack may further include a first wire pattern and a second wire pattern that electrically connect the electrode assemblies. The first wire pattern and the second wire pattern may protrude outside the first sealing film and the second sealing film.

First electrode tabs included in the electrode assemblies may protrude in a same direction from the structure and may be connected to the first wire pattern. Second electrode tabs included in the electrode assemblies may protrude in a same direction from the structure and may be connected to the second wire pattern.

The first wire pattern and the second wire pattern may be ductile.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
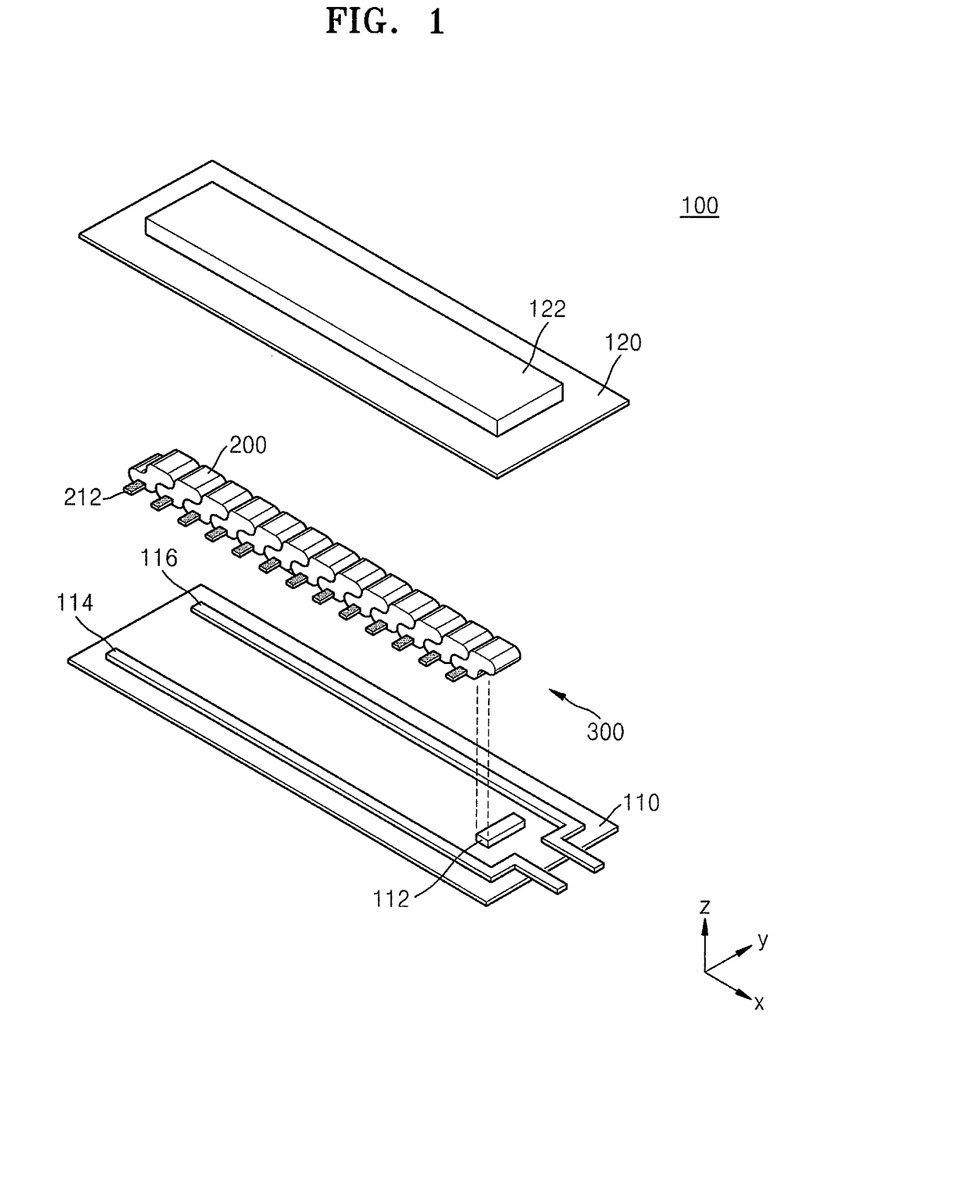
FIG. 1 illustrates an exploded perspective view of a battery pack according to an embodiment.
Figure 2:
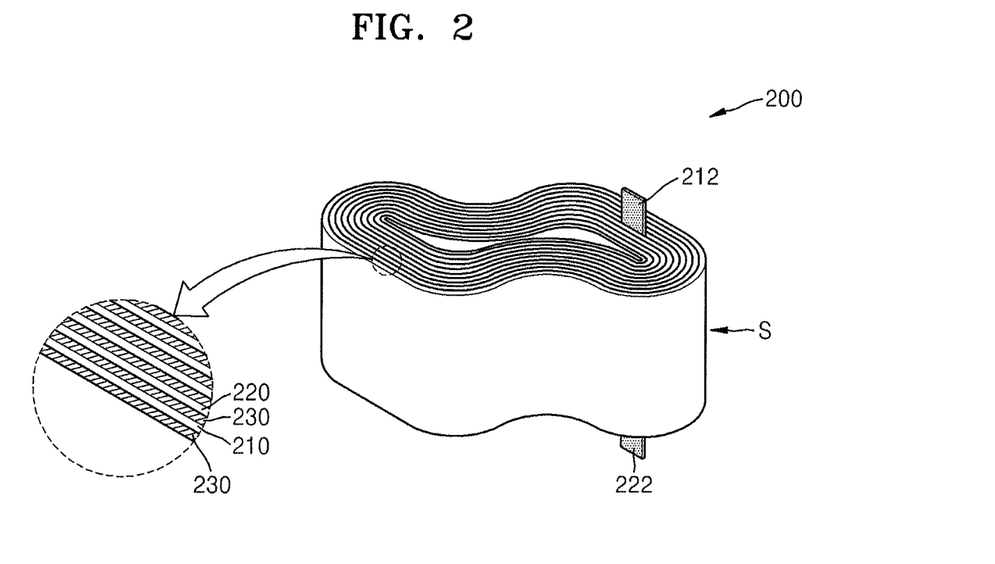
FIG. 2 illustrates a schematic perspective view of an electrode assembly of the battery pack of FIG. 1.
Figure 3A:
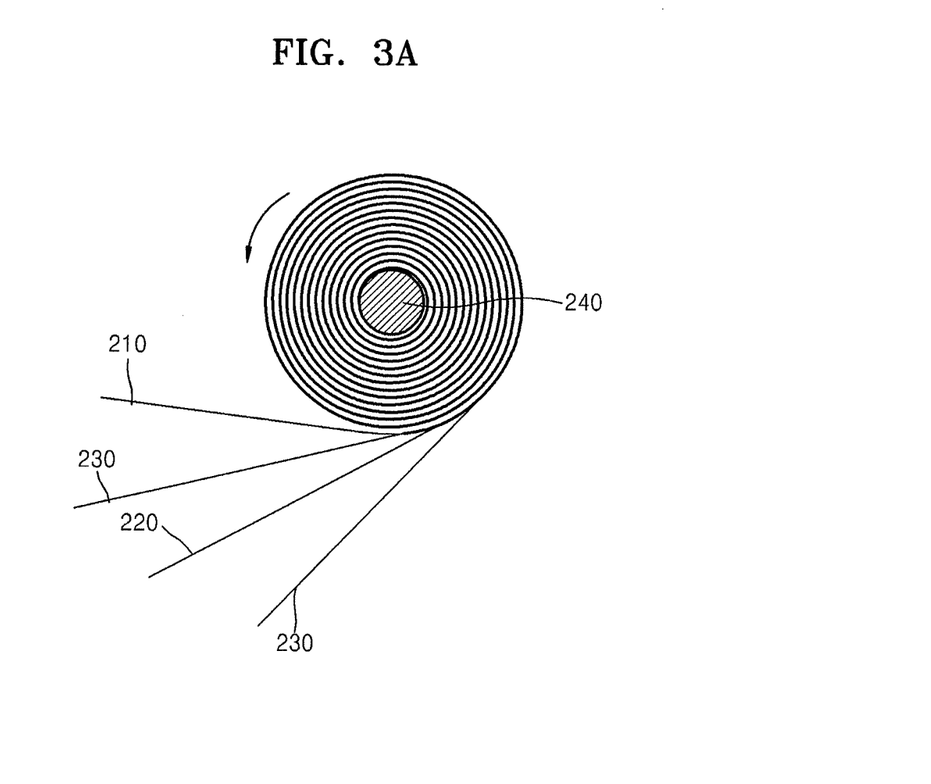
FIGS. 3A to 3C illustrate a schematic view depicting a method of manufacturing the electrode assembly of FIG. 2.
Figure 3B:
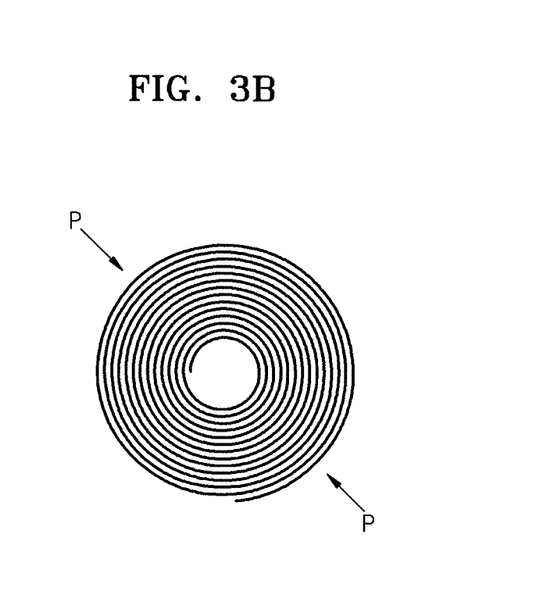
Figure 3C:
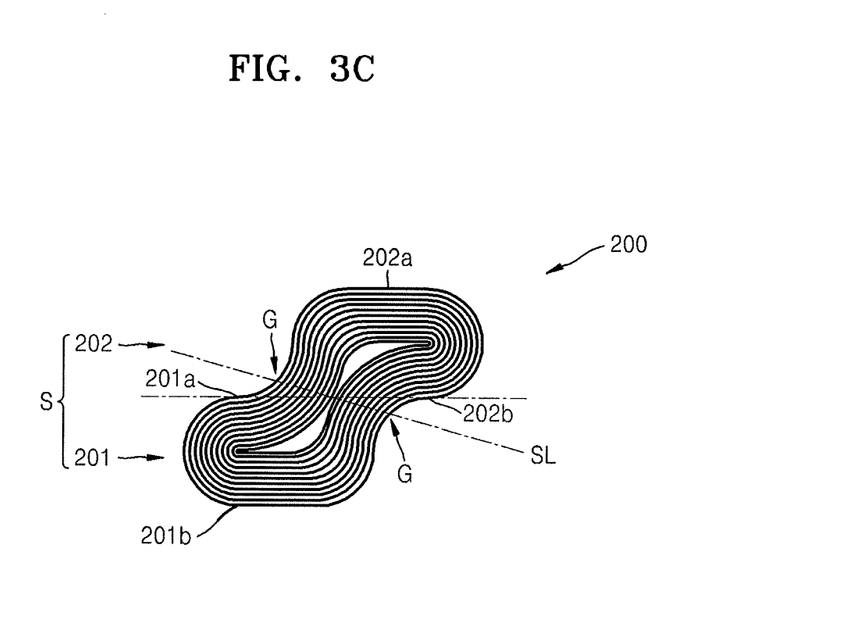

FIG. 1 illustrates an exploded perspective view of a battery pack 100 according to an embodiment. FIG. 2 illustrates a schematic perspective view of an electrode assembly 200 of the battery pack 100 of FIG. 1. FIG. 3 illustrates a schematic view depicting a method of manufacturing the electrode assembly 200 of FIG. 2.

Referring to FIGS. 1 and 2, the battery pack 100 may include a first sealing film 110 and a second sealing film 120 that are joined to each other to form a sealing space, electrode assemblies 200 that are disposed in the sealing space, and a first wire pattern 114 and a second wire pattern 116 that are configured to electrically connect the electrode assemblies 200.

The first sealing film 110 and the second sealing film 120 may be flexible, and may be joined to each other by thermal bonding or adhesive materials to prevent external moisture or oxygen from penetrating into the electrode assemblies 200.

FIG. 1 illustrates that the first sealing film 110 and the second sealing film 120 are separate films. In other implementations, the first sealing film 110 and the second sealing film 120 may be integrated with each other. For example, the second sealing film 120 integrated with one side of the first sealing film 100 may be folded on the first sealing film 110, and then edges thereof may be joined thereto to form the sealing space.

The first sealing film 110 and the second sealing film 120 may have a three-layered structure including an insulating layer, a metal layer, and an insulating layer. For example, the metal layer may be formed of aluminum, steel, or stainless steel, and the insulating layer may be formed of cast polypropylene (CPP), polyethylene terephthalate (PET), or nylon.

The first wire pattern 114 and the second wire pattern 116 may be formed on the first sealing film 110. The first wire pattern 114 and the second wire pattern 116 may be configured to electrically connect the electrode assemblies 200 and fix the positions of the electrode assemblies 200. The first wire pattern 114 and the second wire pattern 116 may protrude outside the first sealing film 110 and the second sealing film 120 that are joined to each other.

The battery pack 100 may be bent in one side, and the first wire pattern 114 and the second wire pattern 116 may be ductile such that they are not cut even when bent. For example, the first wire pattern 114 and the second wire pattern 116 may be formed by printing conductive ink on the first sealing film 110, or by depositing a conductive metal on the first sealing film 110 and etching the deposited conductive metal.

In other implementations, the first wire pattern 114 and the second wire pattern 116 may be joined to the electrode assemblies 200 by ultrasonic welding, and then disposed between the first sealing film 110 and the second sealing film 120 together with the electrode assemblies 200.

FIG. 1 illustrates that each of the first wire pattern 114 and the second wire pattern 116 is formed in a line. In other implementations, the first wire pattern 114 and the second wire pattern 116 may have various patterns, depending on the methods of connecting the electrode assemblies 200 in series, in parallel, or in series-parallel.

A supporter 112 may be further formed on the first sealing film 110. As will be described below, a structure S of the electrode assembly 200 may include a lower first part 201 and an upper second part 202. The second part 202 may be shifted toward one side such that the second part 202 may be partially misaligned with the first part 201.

In the case of the electrode assembly 200 located at the endmost portion of the battery pack 100, a portion of the second part 202 that does not overlap with the first part 201, may be spaced apart from the first sealing film 110 by a predetermined distance. For example, the endmost electrode assembly 200 does not have an adjacent electrode assembly 200 that the second part 202 may overlap. The supporter 112 may be formed under the second part 202, which does not overlap with an adjacent first part 201, to support the second part 202, thereby improving the structural stability of the battery pack 100. For example, the supporter 112 may be formed to have the same height as the first part 201.

A receiving portion 122 may be formed on the second sealing film 120. When the second sealing film 120 is joined to the first sealing film 110, the receiving portion 122 may form a sealing space and may fix the positions of the electrode assemblies 200.

For example, the receiving portion 122 may be formed to protrude from the second sealing film 120 by the thickness of the electrode assembly 200. In other implementations, the receiving portion 122 may be formed to protrude downward from the first sealing film 110, or, as another example, the receiving portion 122 may be formed simultaneously with the first sealing film 110 and the second sealing film 120.

An electrolyte may be received in the sealing space together with the electrode assemblies 200. The electrolyte may be a liquefied electrolyte or a gelled electrolyte. The electrode assemblies 200 may be simultaneously impregnated in the same electrolyte.

The electrode assemblies 200 may be aligned to form an electrode assembly array 300. In other implementations, the electrode assemblies 200 may be disposed in a plurality of lines. For example, a plurality of electrode assembly arrays 300 may be disposed in parallel to each other.

As illustrated in FIG. 2, each of the electrode assemblies 200 may include a structure S including a first electrode plate 210, a second electrode plate 220, and a separator 230 interposed between the first electrode plate 210 and the second electrode plate 220, a first electrode tab 212 connected electrically to the first electrode plate 210, and a second electrode tab 222 connected electrically to the second electrode plate 220.

The first electrode plate 210 may include a first active material portion that is coated with a first active material, and a first uncoated portion that is not coated with the first active material. For example, the first active material may be a positive active material. The positive active material may be a lithium-containing transition metal oxide, such as $LiCoO_2$, $LiNiO_2$, $LiMnO_2$, or $LiMnO_4$, or a lithium chalcogenide compound.

The first active material portion may be formed by coating the first active material on a portion of at least one surface of an aluminum plate. The first uncoated portion may be another portion of the aluminum plate that is not coated with the first active material. For example the first uncoated portion may be disposed at one side of the first electrode plate 210.

The second electrode plate 220 may include a second active material portion that is coated with a second active material, and a second uncoated portion that is not coated with the second active material. For example, the second active material may be a negative active material. The negative active material may be a carbon material, such as crystalline carbon, amorphous carbon, carbon complex, or carbon fiber, a lithium metal, or a lithium alloy.

The second active material portion may be formed by coating the second active material on a portion of at least one surface of a copper plate. The second uncoated portion may be another portion of the copper plate that is not coated with the second active material. For example the second uncoated portion may be disposed at one side of the second electrode plate 220.

The separator 230 may prevent a short circuit between the first electrode plate 210 and the second electrode plate 220, and may enable charge transfer. For example, the separator 230 may be manufactured by coating a polyvinylidenefluoride-hexafluoropropylene (PVDF-HFP) copolymer on a material selected from the group of polyethylene (PE), polystyrene (PS), polypropylene, and a polyethylene-polypropylene copolymer.

The first electrode tab 212 and the second electrode tab 222 may be electrically connected to the first uncoated portion and the second uncoated portion. A connection between the first uncoated portion and the first electrode tab 212 and a connection between the second uncoated portion and the second electrode tab 222 may be made by ultrasonic welding or the like.

The first electrode tab 212 and the second electrode tab 222 may protrude in opposite directions from the structure S, and may be connected to the first wire pattern 114 or the second wire pattern 116 by laser welding or ultrasonic welding.

For example, the first electrode tabs 212 included in the electrode assemblies 200 may protrude in the same direction and may be connected to the first wire pattern 114 that is formed linearly, and the second electrode tabs 222 included in the electrode assemblies 200 may protrude in the same direction and may be connected to the second wire pattern 116 that is formed linearly.

The first wire pattern 114 and the second wire pattern 116 may be spaced apart from each other. Accordingly, a short circuit between the first wire pattern 114 and the second wire pattern 116 may be effectively prevented. The first wire pattern 114 and the second wire pattern 116 may have a simple configuration. Accordingly, the manufacturing efficiency of the battery pack 100 may be improved. The electrode assemblies 200 may be connected in parallel. Accordingly, the capacity of the battery pack 100 may be increased.

The structure S may be formed by simultaneously winding the first electrode plate 210, the second electrode plate 220, and the separator 230 interposed between the first electrode plate 210 and the second electrode plate 220 and pressurizing the resulting structure in a winding surface direction to modify a shape thereof. A fixing tape may be attached to the outermost surface of the structure S to fix the winding of the structure S. The fixing tape may be formed of an insulating material to prevent a short circuit between the adjacent electrode assemblies 200.

Hereinafter, a method of forming the electrode assembly 200 will be described in brief with reference to FIGS. 3A to 3C. For the convenience of description, first electrode tab 212 and the second electrode tab 222 are not shown in FIGS. 3A to 3C.

As illustrated in FIG. 3A, the first electrode plate 210, the separator 230, and the second electrode plate 220 may be simultaneously wound around a rotor 240 that has a cylindrical shape. The first electrode plate 210, the separator 230, and the second electrode plate 220 may be wound by rotating the rotor 240 in one direction. The separator 230 may be disposed at the outermost portion of the battery pack 100 in order to prevent a short circuit between the electrode assemblies 200. After the first electrode plate 210, the separator 230, and the second electrode plate 220 are wound, the resulting structure may be fixed by a fixing tape in order to maintain the wound shape.

The first electrode plate 210, the separator 230, and the second electrode plate 220 may be supplied respectively from a first electrode plate supply unit, a separator supply unit, and a second electrode plate supply unit. When the first electrode plate 210 and the second electrode plate 220 are supplied respectively from the first electrode plate supply unit and the second electrode plate supply unit, the first electrode tab 212 and the second electrode tab 222 may be attached respectively to the first uncoated portion and the second uncoated portion.

After the first electrode plate 210, the separator 230, and the second electrode plate 220 are wound, the rotor 240 may be removed and a pressure P may be applied to a structure S, which is formed to have a cylindrical shape, as illustrated in FIG. 3B, thereby modifying a shape of the structure S as illustrated in FIG. 3C. In this case, a heat treatment may be performed while applying the pressure P to the structure S or after modifying the shape of the structure S by applying the pressure P to the structure S.

The formed structure S may include a pair of grooves G that are formed by being the structure S being pressurized in a direction perpendicular to the winding surface, as illustrated in FIG. 3C. The pair of grooves G may have a concave shape that is elongated in a direction that is parallel to one direction of the structure S. The pair of grooves G may be formed by modifying the shape of the structure S by applying the pressure P to the structure S, which is wound in a cylindrical shape. In this case, the pair of grooves G may be located at opposite sides in the structure S.

The structure S may include the first part 201 and the second part 202 that are located at opposite sides with respect to a reference line SL that is a virtual line connecting the pair of grooves G. The reference line SL may be a virtual line passing through the center of the structure S.

The second part 202 may be shifted in a first direction such that the second part 202 may be partially misaligned with the first part 201. While the first part 201 and the second part 202 are integrated with each other, the second part 202 may be shifted in the first direction by a lateral pressure such that a portion of the second part 202 does not overlap with the first part 201. Therefore, the structure S may have an "S" shape or a "Z" shape on the whole.

The first part 201 may be formed to include a flat upper surface 201a and a lower surface 201b, and the second part 202 may also be formed to include a flat upper surface 202a and a lower surface 202b. For example, when the first part 201 is disposed under the second part 202 and the second part 202 is shifted in a direction that is parallel to a ground surface, the lower surface 201b of the first part 201 may contact the first sealing film 110 (see FIG. 1), while a portion of the second part 202, which does not overlap with the first part 201, may be spaced apart from the first sealing film 110 (see FIG. 1) by a predetermined distance. In this case, the upper surface 201a of the first part 201 and the lower surface 202b of the second part 202 may be located along the same line. That is, the upper surface 201a of the first part 201 and the lower surface 202b of the second part 202 may be formed at the same height.

Also, a cross-sectional area of the first part 201 and a cross-sectional area of the second part 202, which are perpendicular to the winding surface, may be equal to each other. When the reference line SL connecting the pair of grooves G passes through the center of the structure S, the first part 201 and the second part 202 may be formed to have the same area, thereby preventing a stress from being concentrated on any one of the first part 201 and the second part 202. For example, the first part 201 and the second part 202 may be inversely symmetrical to each other.

The electrode assemblies 200 may be aligned to form the electrode assembly array 300 (see FIG. 1). The electrode assembly array 300 (see FIG. 1) may be bent in a second direction that is perpendicular to the first direction in which the second part 202 is shifted.

Figure 4:
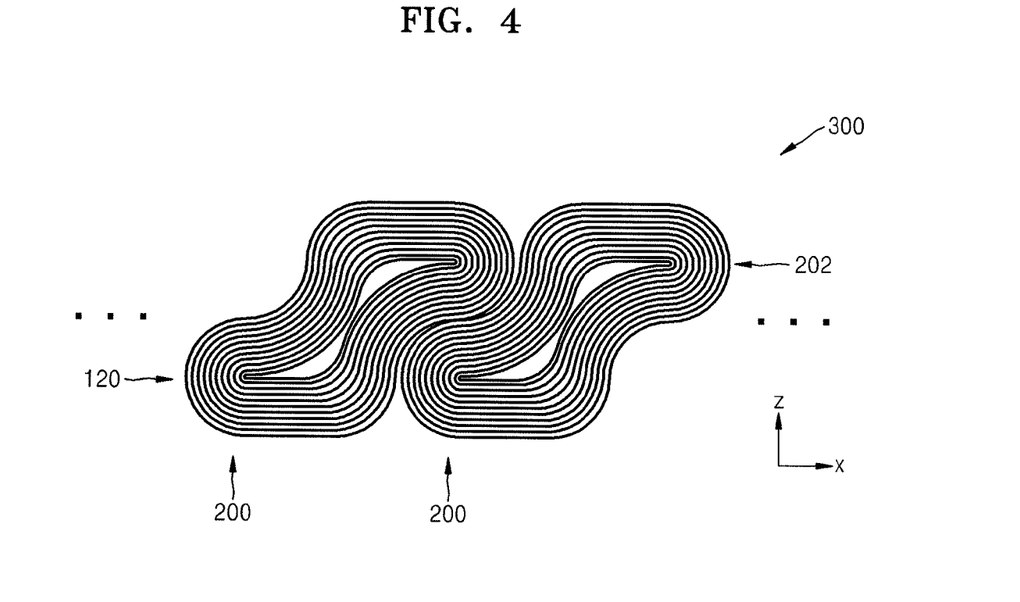
FIG. 4 illustrates a schematic plan view of a portion of an electrode assembly array of FIG. 1.
Figure 5:
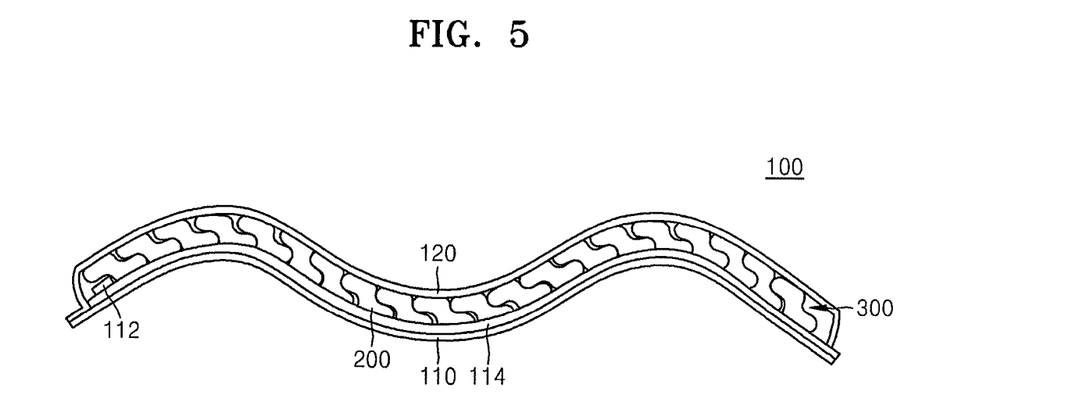
FIG. 5 illustrates a schematic view depicting a shape of the battery pack of FIG. 1.
Figure 6:
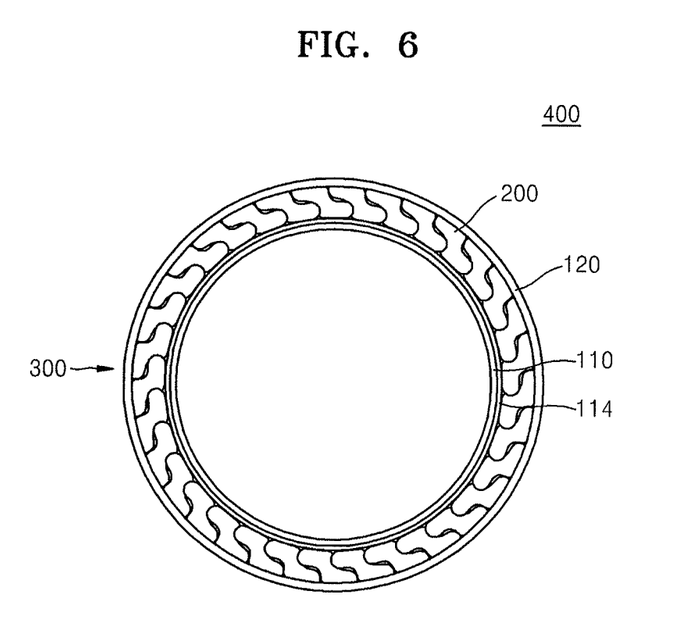
FIG. 6 illustrates a schematic view depicting a shape of a battery pack according to another embodiment.

FIG. 4 illustrates a schematic plan view of a portion of the electrode assembly array 300 of FIG. 1. FIG. 5 illustrates a schematic view illustrating a shape of the battery pack 100 of FIG. 1 according to an embodiment. FIG. 6 illustrates a schematic view illustrating a shape of a battery pack 400 according to another embodiment. For the convenience of description, FIG. 4 illustrates two electrode assemblies 200 that are adjacent to each other in the electrode assembly array 300 of FIG. 1.

Referring to FIGS. 4 and 5, when the electrode assemblies 200 are disposed adjacently, the second part 202 of one of the adjacent electrode assemblies 200 is disposed on the first part 201 of another of the adjacent electrode assemblies 200.

The positions of the electrode assemblies 200 may be fixed by the first wire pattern 114, the second wire pattern 116 (see FIG. 1), and the receiving portion 122 (see FIG. 1). Accordingly, the electrode assemblies 200 may not be attached to each other. The first wire pattern 114, the second wire pattern 116 (see FIG. 1), the first sealing film 110, and the second sealing film 120, which contact the electrode assemblies 200, may all be flexible. Accordingly, when a force is applied to the electrode assembly array 300 in the second direction that is perpendicular to the first direction in which the second part 202 is shifted, the electrode assembly array 300 may be bendable by the force while the first part 200 of the electrode assembly 200 and a portion of the second part 202 of the adjacent electrode assembly 200 are folded.

For example, when the first direction is parallel to the ground surface, the electrode assembly array 300 may be bent in a vertical direction.

FIG. 5 illustrates a shape of the battery pack 100 including the electrode assembly array 300. In detail, FIG. 5 illustrates an embodiment in which the battery module 100 is bent repeatedly in the vertical direction.

In the case of the electrode assembly 200 located at the endmost portion in the electrode assembly array 300, the supporter 112 may be formed under the second part 202 (see FIG. 3), which does not overlap with an adjacent first part 201 (see FIG. 3), to support the second part 202. Therefore, the structural stability of the battery pack 100 may be improved.

The shape of the battery pack 100 may be varied according to the shape of an electronic device. Accordingly, an internal space of the electronic device may be efficiently used.

FIG. 6 illustrates a schematic view illustrating a shape of a battery pack 400 according to another embodiment. FIG. 6 illustrates that the battery pack 400 is bent only in an upward direction or a downward direction to have a circular shape.

In the case of the battery pack 400 of FIG. 6, since the second part 202 (see FIG. 3) of each of the electrode assemblies 200 is supported by the first part 201 (see FIG. 3) of the adjacent electrode assembly 200, the supporter 112 (see FIG. 5) may be omitted herein.

By way of summation and review, it is desirable that secondary batteries for operating electronic devices have a large capacity to provide a sufficient use time of the electronic devices. It is desirable that secondary batteries be changeable into various shapes, for example, by modification such as bending, according to the shapes of the electronic devices using the secondary batteries.

One or more embodiments include electrode assemblies with varied shapes and battery packs including the same.

As described above, according to the one or more of the above embodiments, the capacity of the battery pack may be increased, and the shape of the battery pack may be varied according to the shape of the electronic device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. An electrode assembly, comprising:
   a structure including a first electrode plate and a second electrode plate that are wound together, and a separator between the first electrode plate and the second electrode plate;
   a first electrode tab that is electrically connected to the first electrode plate; and
   a second electrode tab that is electrically connected to the second electrode plate, wherein:
the structure includes a pair of grooves at opposite sides of the structure, the grooves being formed by compression of the structure at the opposite sides in a direction perpendicular to a winding surface, the structure including a first part and a second part that are oppositely located with respect to a reference line connecting the pair of grooves, and
the second part is shifted in a first direction such that the second part is partially misaligned with the first part.

2. The electrode assembly as claimed in claim 1, wherein the first part is under the second part, and
an upper surface of the first part and a lower surface of the second part are on a same line.

3. The electrode assembly as claimed in claim 2, wherein the first direction is parallel to a ground surface.

4. The electrode assembly as claimed in claim 1, wherein a cross-sectional area of the first part and a cross-sectional area of the second part perpendicular to the winding surface are equal to each other.

5. The electrode assembly as claimed in claim 4, wherein the first part and the second part are inversely symmetrical to each other.

6. The electrode assembly as claimed in claim 1, wherein:
the first electrode tab and the second electrode tab are parallel to the winding surface, and
the first electrode tab and the second electrode tab protrude in opposite directions from the structure.

7. The electrode assembly as claimed in claim 6, wherein the first electrode plate includes a first active material portion that is coated with a first active material and a first uncoated portion that is not coated with the first active material, and
the first electrode tab is electrically connected to the first uncoated portion.

8. The electrode assembly as claimed in claim 6, wherein the second electrode plate includes a second active material portion that is coated with a second active material and a second uncoated portion that is not coated with the second active material, and
the second electrode tab is electrically connected to the second uncoated portion.

9. A battery pack, comprising:
a first sealing film and a second sealing film joined to each other to provide a sealing space; and
electrode assemblies in the sealing space,
wherein:
each of the electrode assemblies includes a structure including a first electrode plate and a second electrode plate that are wound together, and a separator that is interposed between the first electrode plate and the second electrode plate,
the structure includes a pair of grooves at opposite sides of the structure, the grooves being formed by compression of the structure at the opposite sides in a direction perpendicular to a winding surface, the structure including a first part and a second part oppositely located with respect to a reference line connecting the pair of grooves, and
the second part is shifted in a first direction such that the second part is partially misaligned with the first part.

10. The battery pack as claimed in claim 9, wherein the first part is under the second part, and
an upper surface of the first part and a lower surface of the second part are on a same line.

11. The battery pack as claimed in claim 10, wherein the electrode assemblies are aligned to form an electrode assembly array in which the first part of one of the electrode assemblies is on the second part of an adjacent electrode assembly.

12. The battery pack as claimed in claim 11, wherein the electrode assembly array is bent in a second direction that is perpendicular to the first direction.

13. The battery pack as claimed in claim 11, wherein the first direction is parallel to a ground surface.

14. The battery pack as claimed in claim 9, wherein a cross-sectional area of the first part and a cross-sectional area of the second part perpendicular to the winding surface are equal to each other.

15. The battery pack as claimed in claim 14, wherein the first part and the second part are inversely symmetrical to each other.

16. The battery pack as claimed in claim 9, wherein
each of the electrode assemblies further includes a first electrode tab that is electrically connected to the first electrode plate and a second electrode tab that is electrically connected to the second electrode plate, and
the first electrode tab and the second electrode tab protrude in opposite directions from the structure.

17. The battery pack as claimed in claim 16, wherein
the first electrode plate includes a first active material portion that is coated with a first active material and a first uncoated portion that is not coated with the first active material, and the first electrode tab is electrically connected to the first uncoated portion, and
the second electrode plate includes a second active material portion that is coated with a second active material and a second uncoated portion that is not coated with the second active material, and the second electrode tab is electrically connected to the second uncoated portion.

18. The battery pack as claimed in claim 17, further comprising a first wire pattern and a second wire pattern that electrically connect the electrode assemblies,
wherein the first wire pattern and the second wire pattern protrude outside the first sealing film and the second sealing film.

19. The battery pack as claimed in claim 18, wherein
first electrode tabs included in the electrode assemblies protrude in a same direction from the structure and are connected to the first wire pattern, and
second electrode tabs included in the electrode assemblies protrude in a same direction from the structure and are connected to the second wire pattern.

20. The battery pack as claimed in claim 19, wherein the first wire pattern and the second wire pattern are ductile.

* * * * *